(12) United States Patent
Oiyama et al.

(10) Patent No.: US 8,851,480 B2
(45) Date of Patent: Oct. 7, 2014

(54) LIP TYPE SEAL

(75) Inventors: Koichiro Oiyama, Tokyo (JP);
Hideyuki Murakami, Tokyo (JP);
Yusaku Nakazono, Tokyo (JP)

(73) Assignee: Eagle Industry Co., Ltd. (JP)

( * ) Notice: Subject to any disclaimer, the term of this patent is extended or adjusted under 35 U.S.C. 154(b) by 359 days.

(21) Appl. No.: 13/387,322

(22) PCT Filed: May 11, 2010

(86) PCT No.: PCT/JP2010/057926
§ 371 (c)(1),
(2), (4) Date: Jan. 26, 2012

(87) PCT Pub. No.: WO2011/030585
PCT Pub. Date: Mar. 17, 2011

(65) Prior Publication Data
US 2012/0169015 A1    Jul. 5, 2012

(30) Foreign Application Priority Data
Sep. 9, 2009  (JP) .................. 2009-207663

(51) Int. Cl.
*F16J 15/02*    (2006.01)
*F16J 15/32*    (2006.01)

(52) U.S. Cl.
CPC .......... *F16J 15/3228* (2013.01); *F16J 15/3268* (2013.01)
USPC ......................................... 277/551; 277/577

(58) Field of Classification Search
USPC .......................................... 277/353, 551, 577
See application file for complete search history.

(56) References Cited

U.S. PATENT DOCUMENTS

| 2,466,335 | A | * | 4/1949 | Stearns ........................ 277/577 |
| 2,926,938 | A | * | 3/1960 | Ratti ............................. 277/576 |
| 4,721,314 | A | * | 1/1988 | Kanayama et al. ........... 277/576 |
| 6,123,514 | A | * | 9/2000 | Kawaguchi et al. ....... 417/222.2 |
| 2009/0134585 | A1 | | 5/2009 | Shimomura et al. |

FOREIGN PATENT DOCUMENTS

| EP | 2065625 A2 | 6/2009 |
| JP | 10-318377 A | 12/1998 |
| JP | 2003-176872 A | 6/2003 |
| JP | 2005-221020 A | 8/2005 |
| JP | 2009-068643 A | 4/2009 |
| JP | 2009-127833 A | 6/2009 |
| WO | WO-2004/076894 A1 | 1/2004 |

* cited by examiner

*Primary Examiner* — Vishal Patel
(74) *Attorney, Agent, or Firm* — Harness, Dickey & Pierce, P.L.C.

(57) ABSTRACT

A lip type seal has a cartridge fitted to an inner periphery of a shaft hole, a first lip seal member, a case, a resin second lip seal member, a backup ring and an adapter, a protrusion section in a partial portion on a circumference is provided in a first flange section of the case to engage with the second lip seal member, whereby the second lip seal member is prevented from whirling with respect to the case and coming off to an inner side in a radial direction, and a projecting section in a partial portion on a circumference is provided in a flange section of the backup ring to engage with the second lip seal member, whereby the second lip seal member is prevented from whirling with respect to the backup ring and coming off to the inner side in the radial direction.

4 Claims, 8 Drawing Sheets

US 8,851,480 B2

LIP TYPE SEAL

CROSS-REFERENCE TO RELATED APPLICATIONS

This application is a U.S. National Stage Application of International Application No. PCT/JP2010/057926, filed on May 11, 2010 and published in Japanese as WO 2011/030585 on Mar. 17, 2011. This application claims the benefit of Japanese Application No. 2009-207663, filed on Sep. 9, 2009. The entire disclosures of the above applications are incorporated herein by reference.

BACKGROUND OF THE INVENTION

1. Field of the Invention

The present invention relates to a lip type seal corresponding to one kind of a sealing apparatus. The lip type seal in accordance with the present invention is used, for example, as a shaft seal which is applied to a water pump (W/P) for a vehicle such as a motor vehicle or the like, or used as a shaft seal which is applied to a W/P for a household appliance or a light-load industry or the like.

2. Description of the Conventional Art

Conventionally, as shown in FIG. 10, there has been known a lip type seal 81 which inhibits a sealed fluid within a machine from leaking to an ambient air side by being installed to an inner periphery of a shaft hole 72a of a housing 72 so as to slidably come into close contact with a peripheral surface of a shaft 74 which is inserted to the shaft hole 72a. This lip type seal 81 has a first seal lip 82 which is arranged in a sealed fluid side A and is made of a rubber-like elastic material, and a second seal lip 83 which is arranged in an ambient air side B and is made of a resin (refer to Japanese Unexamined Patent Publication No. 10-318377).

Since the conventional lip type seal 81 has a plurality of seal lips 82 and 83 each of which achieves a sealing action, it can achieve an excellent sealing effect, however, it causes a disadvantage in the following point.

At the request on recycle against an environmental problem in recent years, each of component parts of the lip type seal is requested to be disposed after being sorted on a material, however, in the conventional lip type seal 81, the first seal lip 82 made of the rubber-like elastic material is bonded through vulcanization to a reinforcing ring 84 made of a metal, and both the elements 82 and 84 are formed as an integral vulcanization molded product. Accordingly, it is impossible to easily separate and sort both the elements 82 and 84 at a time of disposing. Therefore, it is impossible to comply with the request on the recycle.

Consequently, the applicant of the present invention has previously proposed a lip type seal 91 which has a first lip seal member 92 which is provided with a first seal lip 93 arranged in a sealed fluid side A and is made of a rubber-like elastic material, a second lip seal member 94 which is provided with a second seal lip 95 arranged in an ambient air side B and is made of a resin, and two cases 96 and 97 which pinch both the lip seal members 92 and 94 from both sides in an axial direction and are made of a metal, and is structured such that these four parts are assembled in a non-bonding manner, as shown in FIG. 11 (refer to WO2004/076894A1). In accordance with this prior art, since each of the parts is not bonded, it is possible to easily separate and sort each of the parts, whereby it is possible to comply with the request on the recycle. However, in this prior art, there is room for improvement in the following point.

(1) Assembly Retaining Property Between Component Parts

In the lip type seal 91, two cases 96 and 97 respectively have annular flat surface sections 96a and 97a for pinching both the lip seal members 92 and 94 from both sides in the axial direction and are structured such that tubular sections 96b and 97b are integrally formed in the flat surface sections 96a and 97a. The tubular sections 96b and 97b are respectively fitted to an inner peripheral side of a cylinder section 92a of the first lip seal member 92 in the case 96 in the sealed fluid side A and press-fitted fixedly to an insertion hole 92b which is provided in the cylinder section 92a of the first lip seal member 92 in the case 97 in the ambient air side B. Therefore, each of the parts is retained in an assembled state by setting a fitting margin and a press-fit margin incident to the fitting and the press-fit, however, in the case that each of the parts is exposed to a force in the axial direction, any engaging structure for preventing the parts from being separated from each other in the axial direction is not particularly provided between the parts. Accordingly, if the case 96 in the sealed fluid side A is pulled in an axial direction (a direction of an arrow C) for detaching the lip type seal 91 in a state of being installed to an inner periphery of the shaft hole 72a of the housing 72, there is a case that only the case 96 is pulled out and the other parts are left in a state of being installed (alternatively, only the case 96 and the first lip seal member 92 may be pulled out, and the second lip seal member 94 and the case 97 in the ambient air side B may be left). This is caused by nothing but the fact that the assembly retaining force between the parts depends only on a friction force.

(2) Installation Workability

Further, in the lip type seal 91 mentioned above, two cases 96 and 97 do not particularly have any structure for defining a distance in the axial direction between them. Further, the first lip seal member 92 which is pinched between both the elements and is made of the rubber-like elastic material cannot achieve a sufficient sealing action unless it is used in a state of being compressed in the axial direction. In other words, there is fear that a leakage of the sealed fluid is caused from gaps with respect to the second lip seal member 94 made of the resin and the case 97 in the ambient air side B. Accordingly, at a time of installing the lip type seal 91 mentioned above, the lip type seal 91 is contacted to a step section 98 which is provided in an inner periphery of the shaft hole 72a of the housing 72, and is installed by using a snap ring 99 while applying a compression load in the axial direction, whereby the lip type seal 91 is installed in a state in which a whole thereof is compressed in the axial direction between the step section 98 and the snap ring 99. However, there is such a disadvantage that a work of installing by using the snap ring 99 while applying the compression load in the axial direction as mentioned above is extremely complicated.

Further, since the annular insertion hole 92b which is open to the ambient air side B is provided in the cylinder section 92a of the first lip seal member 92, a position in an outer peripheral side than the insertion hole 92b in the cylinder section 92a is formed into such a shape that the ambient air side end portion 92c is terminated while remaining in the cylindrical shape. Therefore, since the ambient air side end portion 92c rubs against an inner peripheral surface of the shaft hole 72a at a time of inserting the first lip seal member 92 to an inner periphery of the shaft hole 72a of the housing 72, there is a case that evagination is caused in the ambient side end portion 92c.

Further, in a bonding type lip seal in which the seal lip 82 made of the rubber-like elastic material is bonded through vulcanization to the reinforcing ring 84 made of the metal as shown in FIG. 10, a problem in resistance against foaming is pointed out. In conjunction with a high speed and a high temperature of an engine in recent years, cooling water of a water pump for cooling the engine tends to have a high temperature and a high pressure, and an ambient atmosphere of the seal section becomes harsh. Under the use condition mentioned above, in the bonding type lip seal mentioned above, since the seal lip 82 made of the rubber-like elastic material and the reinforcing ring 84 made of the metal are bonded, there is a case that a foaming phenomenon is caused in the seal lip 82 in the case of being used under a high load condition, and this causes a reduction of a sealing performance.

SUMMARY OF THE INVENTION

Problem to be Solved by the Invention

The present invention is made by taking the points mentioned above into consideration, and an object of the present invention is to provide a lip type seal, component parts of which can be easily separated and sorted per material, whereby it is possible to comply with a request on recycle, an assembly retaining property between the component parts is good and an installation workability is good. In addition to the above, an object of the present invention is to provide a lip type seal which has a good resistance against foaming so that a sealing performance can be stabilized. Further, in addition, an object of the present invention is to provide a lip type seal which has a good assembling property with respect to a cartridge of a first lip seal member made of a rubber-like elastic material so that a circularity and a coaxiality of the seal lip of the first lip seal member can be secured, whereby it is possible to stabilize the sealing performance. Further, in addition, an object of the present invention is to provide a lip type seal, the component parts of which can be prevented from relatively moving in a circumferential direction, whereby the assembly retaining property between the parts is good, and it is possible to stabilize the sealing performance. Further, in addition, an object of the present invention is to provide a lip type seal in which the second lip seal member corresponding to the component part of the lip type seal and made of the resin can be effectively inhibited from being dragged by the shaft so as to get out of a portion between the case and the backup ring to an inner side in a radial direction at a time of inserting the shaft.

Means for Solving the Problem

In order to achieve the object mentioned above, a lip type seal in accordance with the present invention is a lip type seal which is installed to an inner periphery of a shaft hole of a housing so as to slidably come into close contact with a peripheral surface of a shaft, thereby inhibiting a sealed fluid within a machine from leaking to an ambient air side, the lip type seal comprising a cartridge which is fitted to the inner periphery of the shaft hole, a first lip seal member which is fitted to the cartridge in a non-bonding manner and is made of a rubber-like elastic material, a case which is fitted to the first lip seal member in a non-bonding manner, a second lip seal member which is made of a resin and a backup ring which supports the second lip seal member, the second lip seal member and the backup ring being retained in a caulking manner to the case, and an adapter which is fitted to the cartridge in a sealed fluid side of the first lip seal member, characterized in that the cartridge integrally has an inward flange section in an ambient air side end portion of a tubular section, that the first lip seal member integrally has a cylinder section which is fitted to an inner peripheral side of the tubular section of the cartridge, a radial portion which is provided in an end portion in the sealed fluid side of the cylinder section, and a seal lip which is provided in an inner peripheral end portion of the radial portion, that the case integrally has a tubular section which is fitted between the radial portion and the flange section of the cartridge in an inner peripheral side of the cylinder section of the first lip seal member, a first flange section which is provided in the end portion in the sealed fluid side of the tubular section in such a manner as to be in contact with the radial portion, and a second flange section which is provided in an end portion in an ambient air side of the tubular section in such a manner as to be in contact with the flange section of the cartridge, and retains in a caulking manner the second lip seal member and the backup ring between the first and second flange sections, that the backup ring has a flange section which pinches the second lip seal member with respect to the first flange section of the case, that the adapter prevents the first lip seal member from coming off from the cartridge by being fitted to the cartridge in the sealed fluid side of the first lip seal member, that a protrusion section in a partial portion on a circumference is provided in the first flange section in the case, and the protrusion section is engaged with the second lip seal member made of the resin, whereby the second lip seal member made of the resin is prevented from whirling with respect to the case and prevented from coming off to an inner side in a radial direction, and that a projecting section in a partial portion on a circumference is provided in the flange section in the backup ring, and the projecting section is engaged with the second lip seal member made of the resin, whereby the second lip seal member made of the resin is prevented from whirling with respect to the backup ring and prevented from coming off to the inner side in the radial direction.

The lip type seal in accordance with the present invention having the structure mentioned above is structured such as to inhibit the sealed fluid within the machine from leaking to the ambient air side by being installed to the inner periphery of the shaft hole of the housing so as to be slidably brought into close contact with the peripheral surface of the shaft, and has six parts constituted by the cartridge, the first lip seal member made of the rubber-like elastic material, the case, the second lip seal member made of the resin, the backup ring and the adapter, as the component parts thereof. Among them, the first lip seal member made of the rubber-like elastic material is fitted in the non-bonding manner to the cartridge, the case is fitted in the non-bonding manner to the first lip seal member, the second lip seal member made of the resin and the backup ring are retained in the caulking manner to the case, and the adapter is fitted to the cartridge (the fitting between the metals). Accordingly, since six parts are assembled in the non-bonding manner without being bonded to each other, it is possible to easily separate and sort each of the parts at a time of dissembling the seal.

Further, since the second lip seal member and the backup ring are retained in the caulking manner to the case, these three parts are firmly assembled with each other in spite of the non-bonding, and do not relatively move in the axial direction. In the case, since the first flange section in the sealed fluid side thereof is arranged in such a manner as to come into contact with the radial portion of the first lip seal member, and the second flange section in the ambient air side is arranged in such a manner as to come into contact with the flange section of the cartridge, the cartridge, the case and the first lip seal member are accurately positioned in the axial direction with each other. Since the adapter is fitted to the cartridge in the sealed fluid side of the first lip seal member, the first lip seal member does not come off in the axial direction from the cartridge. Accordingly, since all of six parts are firmly assembled in association with each other, it is possible to increase the assembly retaining force between the parts.

Further, in the lip type seal in accordance with the present invention having the structure mentioned above, six parts have been already integrated by caulking and fitting at a time of installing the seal to the housing, and an assembly has been finished in an immediately usable state. Therefore, it is possible to omit an adjusting step or the like for maintaining an assembly length precision in the axial direction, which is necessary in the installing step of the conventional non-bonding type lip seal.

Further, since the first lip seal member made of the rubber-like elastic material is fitted in the non-bonding manner to the cartridge, and the case is fitted in the non-bonding manner to the first lip seal member, the lip type seal does not have such a structure that the rubber-like elastic material (the first lip seal member) is bonded through vulcanization to the metal (the cartridge or the case). Accordingly, even if the lip type seal is used under a high load condition, a foaming phenomenon which is peculiar to the bonding structure is not caused in the rubber-like elastic material.

In addition, an assembling procedure of the lip type seal is comprised of steps of fixing by caulking the second lip seal member made of the resin and the backup ring by the case, placing the first lip seal member made of the rubber-like elastic material thereon, and thereafter inserting it to the cartridge. However, if the first lip seal member made of the rubber-like elastic material greatly deformed at a time of inserting, there is fear that a circularity and a coaxiality of a leading end of the seal lip are deteriorated. Consequently, in accordance with the present invention, the first lip seal member is structured such as to be prevented from coming off from the cartridge, by fitting the adapter to the sealed fluid side of the first lip seal member without deforming the first lip seal member greatly at a time of inserting.

Accordingly, since a function of the adapter is to prevent the first lip seal member from coming off from the cartridge without deforming greatly, it is preferable that the adapter is not pressed against the first lip seal member greatly (if the adapter is strongly pressed against the first lip seal member, there is fear that the first lip seal member is deformed thereby and the circularity and the coaxiality of the leading end of the seal lip are deteriorated). Further, in the case that a deformation in the axial direction is taken into consideration on the basis of a swelling or the like by the sealed fluid of the first lip seal member, an initial axial gap may be set between the first lip seal member and the adapter. In this case, as long as the circularity and the coaxiality of the seal lip can be maintained, the adapter may be pressed against the first lip seal member, thereby coming to a part of a construction which suppresses a co-rotation of the first lip seal member with respect to the shaft. Further, a projection may be provided in the first lip seal member or the adapter which comes into contact with each other, and if the projection is provided as mentioned above, it is possible to enhance a co-rotation suppressing effect.

Further, an increase of the assembly retaining force between the parts mentioned above is mainly made to prevent the parts from relatively moving with each other in the axial direction, however, there is a case that a countermeasure is requested in order that the parts do not relatively move with each other in a circumferential direction. Further, as shown in FIG. 12 as a comparative example, there is fear that when inserting a shaft 74 to an inner periphery of a lip type seal 1 from an ambient air side B in one side of an axial direction (an arrow C), a second lip seal member 41 made of a resin is dragged by the shaft 74 so as to move to an inner side in a radial direction (an arrow D), and pushes up a first lip seal member 21 made of a rubber-like elastic material by a leading end thereof (an arrow E), thereby lowering a sealing function. Consequently, the present invention is structured such that a protrusion section in a partial portion on a circumference is provided in a first flange section in the case, and the protrusion section engages with the second lip seal member made of the resin, whereby the second lip seal member made of the resin is prevented from whirling with respect to the case and is prevented from coming off to an inner side in the radial direction, and a projecting section in a partial portion on a circumference is provided in the flange section in the backup ring, and the projecting section engages with the second lip seal member made of the resin in the same manner, whereby the second lip seal member made of the resin is prevented from whirling with respect to the backup ring and prevented from coming off to the inner side in the radial direction. Since the first flange section of the case is arranged in the sealed fluid side of the second lip seal member made of the resin, and the flange section of the backup ring is arranged in the ambient air side of the second lip seal member made of the resin, both the elements are at a positions where they pinch the second lip seal member made of the resin from both sides in the axial direction, and since both the elements are provided respectively with the protrusion section and the projecting section, and they cut into the second lip seal member made of the resin, it is possible to firmly retain the second lip seal member.

Effect of the Invention

The present invention achieves the following effects.

In the present invention, since the lip type seal has six parts constituted by the cartridge, the first lip seal member made of the rubber-like elastic material, the case, the second lip seal member made of the resin, the backup ring and the adapter as mentioned above, the first lip seal member among them is fitted in the non-bonding manner to the cartridge, the case is fitted in the non-bonding manner to the first lip seal member, the second lip seal member and the backup ring are retained in the caulking manner to the case, and the adapter is fitted to the cartridge, it is possible to easily separate and sort each of the parts at a time of disassembling the seal. Accordingly, it is possible to comply with request on the recycle for disposing the component parts of the lip type seal after sorting on the material.

Further, since the second lip seal member and the backup ring are retained in the caulking manner to the case, these three parts are firmly assembled with each other in spite of the non-bonding manner. In the case, since the first flange section in the sealed fluid side is arranged in such a manner as to come into contact with the radial portion of the first lip seal member, and the second flange section in the ambient air side is arranged in such a manner as to come into contact with the flange section of the cartridge, the cartridge, the case and the first lip seal member are accurately positioned in the axial direction with each other. Since the adapter is fitted to the cartridge in the sealed fluid side of the first lip seal member, the first lip seal member does not come off in the axial direction from the cartridge. Accordingly, since all of six parts are firmly assembled in association with each other, it is possible to increase the assembly retaining force between the parts. Therefore, it is possible to prevent the disadvantage that only some of the parts are pulled out at a time of detaching the lip type seal from the housing as in the prior art mentioned above from being caused.

Further, since six parts have been already assembled completely at a time of installing the lip type seal to the housing, it is possible to omit the adjusting step or the like for maintaining the assembly length precision in the axial direction, which is necessary in the installing step of the conventional non-bonding type lip seal.

Further, it does not have such a structure that the rubber-like elastic material (the first lip seal member) is bonded through vulcanization to the metal (the cartridge or the case). Accordingly, even if the lip type seal is used under the high load condition, the foaming phenomenon is not caused in the rubber-like elastic material. Therefore, it is possible to improve the resistance against foaming of the lip type seal, and it is possible to stabilize the sealing performance.

Further, since the first lip seal member is structured such as to be prevented from coming off from the cartridge by fitting the adapter to the sealed fluid side of the first lip seal member without greatly deforming the first lip seal member at a time of inserting the first lip seal member made of the rubber-like elastic material to the cartridge, the first lip seal member does not deform greatly. As a result, it is possible to secure the circularity and the coaxiality of the seal lip of the first lip seal member. Accordingly, it is possible to stabilize the sealing performance on the basis of the seal lip of the first lip seal member.

Further, the protrusion section in the partial portion on the circumference is provided in the first flange section in the case, and the protrusion section engages with the second lip seal member made of the resin, whereby the second lip seal member made of the resin is prevented from whirling with respect to the case and is prevented from coming off to the inner side in the radial direction, and the projecting section in the partial portion on the circumference is provided in the flange section in the backup ring, and the projecting section engages with the second lip seal member made of the resin in the same manner, whereby the second lip seal member made of the resin is prevented from whirling with respect to the backup ring and prevented from coming off to the inner side in the radial direction. In accordance with this structure, it is possible to firmly retain the second lip seal member by the protrusion section and the projecting section. Accordingly, it is possible to effectively prevent the component parts from relatively rotating, and prevent the second lip seal member made of the resin from being dragged by the shaft at a time of inserting the shaft so as to get out of the portion between the case and the backup ring to the inner side in the radial direction, and it is possible to stabilize the sealing performance.

DETAILED DESCRIPTION OF PREFERRED EMBODIMENTS

Next, a description will be given of embodiments in accordance with the present invention with reference to the accompanying drawings.

First Embodiment

Figure 1:
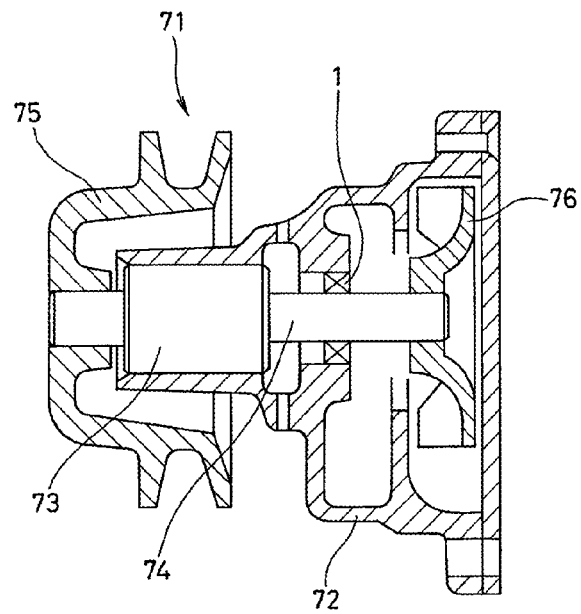
FIG. 1 is a sectional view of a water pump to which a lip type seal in accordance with a first embodiment of the present invention is installed.

FIG. 1 shows a general view of a water pump 71 to which a lip type seal 1 in accordance with an embodiment of the present invention is installed. In particular, a pulley 75 is fixed to one end of a shaft (a rotating shaft) 74 which is rotatably supported to a housing (a casing) 72 via a bearing 73, and an impeller 76 is fixed to another end thereof. If a driving torque is transmitted to the pulley 75, the impeller 76 rotates so as to pressure feed cooling water. The lip type seal 1 is inhibits a sealed fluid (cooling water) within a machine from leaking to an ambient air side (a bearing side) by being installed to an inner periphery of a shaft hole of the housing 72 so as to slidably come into close contact with a peripheral surface of the shaft 74.

Figure 2:
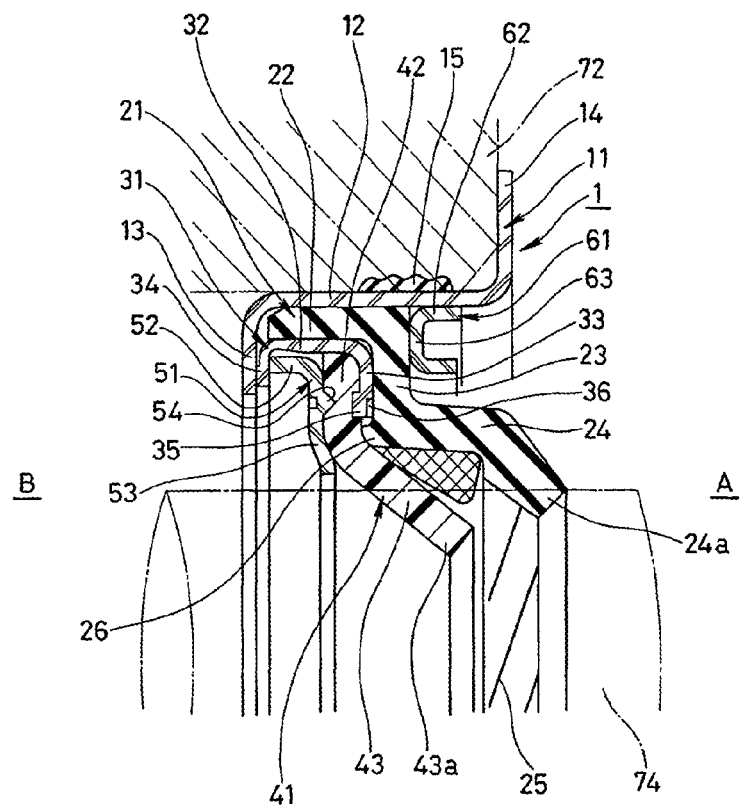
FIG. 2 is a sectional view of a substantial part of the lip type seal.

FIG. 2 shows a section of a substantial part of the lip type seal 1 in accordance with the first embodiment, and the lip type seal 1 is structured as follows. A right side of the drawing is a sealed fluid side A, and a left side of the drawing is an ambient air side B.

The lip type seal 1 is structured such as to be installed to the inner periphery of the shaft hole of the housing 72 so as to slidably comes into close contact with the periphery of the shaft 74, and is constructed as a two-stage lip structure while having a seal lip 24 which is arranged in the sealed fluid side A and is made of a rubber-like elastic material, and a seal lip 43 which is arranged in the ambient air side B and is made of a resin.

Further, the lip type seal 1 has six parts constructed by a cartridge 11 which is fitted to the inner periphery of the shaft hole of the housing 72, a first lip seal member 21 which is fitted and retained in a non-bonding manner to the cartridge 11 and is made of a rubber-like elastic material, a case 31 which is fitted and retained in a non-bonding manner to the first lip seal member 21, a second lip seal member 41 which is retained in a caulking manner to the case 31 and is made of a resin, a backup ring 51 which is also retained in a caulking manner to the case 31 and is arranged to the ambient air side B of the second lip seal member 41 so as to support the second lip seal member 41, and an adapter 61 which prevents the first lip seal member 21 from coming off from the cartridge 11 by being fitted to the cartridge 11 in the sealed fluid side A of the first lip seal member 21, as its component parts.

Among them, first of all, the cartridge 11 is constructed by a predetermined rigid material such as a metal or the like, for example, a pressed product of a metal sheet, is formed in an annular shape as a whole, has a tubular section 12 which is fitted to the inner periphery of the shaft hole of the housing 72, and is structured such that a flange section (an inward flange section) 13 is integrally formed from an end portion in the ambient air side of the tubular section 12 toward an inner side in a radial direction. Further, an outward flange section 14 is integrally formed in an end portion in the sealed fluid side of the tubular section 12 so as to be directed to an outer side in the radial direction. The former flange section 13 operates as an end wall portion to which the case 31 is contacted from one side in an axial direction at a time of assembling the lip type seal 1, and operates as an end wall portion which pinches the case 31 and the first lip seal member 21 with respect to the adapter 61 after being assembled. The latter outward flange section 14 achieves an operation of defining an insertion length (an insertion depth in an axial direction) by contacting to a peripheral edge portion of an opening of the shaft hole of the housing 72 at a time of inserting the lip type seal 1 to the shaft hole of the housing 72, however, there is a case that it is omitted when the lip type seal 1 is installed deep in the shaft hole. Further, an outer peripheral seal section 15, which is interposed between the cartridge 11 and the inner peripheral surface of the shaft hole so as to carry out a sealing action and is made of an elastic film, is attached to an outer peripheral surface of the tubular section 12 all over a whole periphery.

The first lip seal member 21 is constructed by a predetermined rubber-like elastic material (for example, an H-NBR), is formed in an annular shape as a whole, has a cylinder section 22 which is fitted in a non-bonding manner to an inner peripheral side of the tubular section 12 of the cartridge 11, and is structured such that an annular radial portion 23 is integrally formed from an end portion in the sealed fluid side of the cylinder section 22 toward an inner side in the radial direction, and a seal lip (a first seal lip) 24 is integrally formed from an inner peripheral end portion of the radial portion 23 toward the sealed fluid side A. The seal lip 24 is structured such as to slidably come into close contact with a peripheral surface of the shaft 74 by its lip end 24a, and is provided in a sliding portion with a screw section (a screw seal) 25 which carries out a pumping action at a time when the shaft rotates.

The case 31 is constructed by a pressed product of a metal sheet (for example, a stainless steel or a steel (SPCC, SPHC or the like)), is formed in an annular shape as a whole, has a tubular section 32 which is fitted in a non-bonding manner between the radial portion 23 and the flange section 13 of the cartridge 11 in an inner peripheral side of the cylinder section 22 of the first lip seal member 21, and is structured such that a first flange section 33 is integrally formed from an end portion in the sealed fluid side of the tubular section 32 toward an inner side in the radial direction, and a second flange section 34 is integrally formed from an end portion in the ambient air side of the tubular section 32 toward the inner side in the radial direction. Accordingly, the case 31 is formed in a C-shaped sectional shape which is open toward the inner side in the radial direction as a whole, and after being assembled, the tubular section 32, the first flange section 33 and the second flange section 34 come into close contact with the cylinder section 22, the radial portion 23 and the flange section 13, respectively. A protrusion section 35 and a concave section 36 for preventing whirling and preventing coming-off are formed in the first flange section 33, however, a description will be given later of them.

The second lip seal member 41 is made of a predetermined resin material (for example, PTFE), is formed in an annular shape as a whole, has an annular flat surface section 42, and is structured such that a seal lip (a second seal lip) 43 is integrally formed in an inner peripheral end portion of the flat surface section 42 in such a manner as to be inclined to the sealed fluid side A. Since the seal lip 43 is structured such as to slidably come into close contact with a peripheral surface of the shaft 74 by its lip end 43a, and is arranged in the ambient air side B of the first seal lip 24, it forms a secondary seal while the first seal lip 24 forms a primary seal.

The backup ring 51 is constructed by a pressed product of the metal sheet (for example, the stainless steel or the steel (SPCC, SPHC or the like)) in the same manner as the case 31, is formed in an annular shape as a whole, has a cylinder section 52, and is structured such that a flange section 53 is integrally formed from an end portion in the sealed fluid side of the cylinder section 52 toward an inner side in the radial direction. The backup ring 51 is arranged in the ambient air side B of the second lip seal member 41, and carries out an operation of supporting the second lip seal member 41 from the ambient air side B. A projecting section 54 for preventing whirling and preventing coming-off is formed in the flange section 53, however, a description will be given later of this.

The second lip seal member 41 and the backup ring 51 are retained in a caulking manner to the case 31 as mentioned above, and the flat surface section 42 of the second lip seal member 41 and the cylinder section 52 of the backup ring 51 are fixed in a caulking manner side by side in the axial direction between the first and second flange sections 33 and 34 in the inner peripheral side of the tubular section 32 of the case 31. The caulking process is carried out by folding the second flange section 34 having a comparatively thin bending portion. After caulking, the second lip seal member 41 comes into pressure contact with the first flange section 33 by the flat surface section 42.

The adapter 61 is constructed by a pressed product of the metal sheet (for example, the stainless steel or the steel (SPCC, SPHC or the like)) in the same manner as the case 31 and the backup ring 51, is formed in an annular shape as a whole, has an annular section 62 which is fitted to an inner peripheral side of the tubular section 12 of the cartridge 11 in the sealed fluid side A of the cylinder section 22 of the first lip seal member 21, and is structured such that an inward flange-shaped pressing section 63 is integrally formed from an end portion in the ambient air side of the annular section 62 toward an inner side in the radial direction, and an inner peripheral end portion of the pressing section 63 is bent to the sealed fluid side A. The adapter 61 presses the first lip seal member 21 by the pressing section 63, prevents it from coming off, and stabilizes an attitude, and in order to sufficiently achieve the function, an inner diameter dimension of the pressing section 63 is set to be smaller than an outer diameter dimension of the first flange section 33 of the case 31, whereby the adapter 61 pinches a part of the radial portion 23 of the first lip seal member 21 between both the elements 33 and 63.

Further, there is provided a structure for preventing the case 31 and the second lip seal member 41 from whirling and preventing them from moving in a radial direction, and this structure is constructed by the protrusion section 35 which is provided in the first flange section 33 of the case 31. In particular, the protrusion section 35 in a partial portion on a circumference is provided in the end surface in the ambient air side of the first flange section 33 in the case 31 so as to be directed to the ambient air side B, the protrusion section 35 engages with the second lip seal member 41 in a circumferential direction, whereby the case 31 and the second lip seal member 41 are prevented from whirling, and the case 31 and the second lip seal member 41 are prevented from relatively moving in the radial direction on the basis of the engagement in the radial direction. The engagement is achieved by the protrusion section 35 cutting into a surface of the second lip seal member 41 on the basis of a caulking force at a time of a caulking process, however, a corresponding concave section may be previously provided in the second lip seal member 41 so as to make the protrusion section 35 fit thereto.

Further, since the case 31 is constructed by the pressed product of the metal sheet as mentioned above, a concave section 36 in a partial portion on a circumference corresponding to the protrusion section 35 is formed in the end surface in the sealed fluid side of the first flange section 33 by forming the protrusion section 35 in accordance with the pressing process. Accordingly, the first lip seal member 21 made of the rubber-like elastic material engages with the concave section 36 in a circumferential direction, whereby the case 31 and the first lip seal member 21 are prevented from whirling, and thus the whirling preventing structure is provided here too. The engagement is achieved by the rubber in a partial portion of the first lip seal member 21 entering into the concave section 36 by utilizing a press fit margin of the case 31 with respect to the first lip seal member 21, however, a corresponding protrusion section may be previously provided in the first lip seal member 21 so as to be fitted to the concave section 36. The desired number of protrusion sections 35 and concave sections 36 are provided on the circumference, that is, they are provided at one position or a plurality of positions on the circumference, and it is preferable that they are arranged at a uniform interval in the case of being provided at a plurality of positions.

Further, there is also provided with a structure for preventing the backup ring 51 and the second lip seal member 41 from whirling and preventing them from moving in a radial direction, and this structure is constructed by the projecting section 54 which is provided in the flange section 53 of the backup ring 51. In particular, the projecting section 54 in a partial portion on a circumference is provided in the end surface in the sealed fluid side of the flange section 53 in the backup ring 51 so as to be directed to the sealed fluid side A, the projecting section 54 engages with the second lip seal member 41 in a circumferential direction, whereby the backup ring 51 and the second lip seal member 41 are prevented from whirling, and the backup ring 51 and the second lip seal member 41 are prevented from relatively moving in the radial direction on the basis of the engagement in the radial direction. The engagement is achieved by the projecting section 54 cutting into the surface of the second lip seal member 41 on the basis of a caulking force at a time of a caulking process, however, a corresponding concave section may be previously provided in the second lip seal member 41 so as to make the projecting section 54 fit thereto. The desired numbers of projecting sections 54 are provided on the circumference, that is, they are provided at one position or a plurality of positions on the circumference, and it is preferable that they are arranged at a uniform interval in the case of being provided at a plurality of positions.

Figure 3:
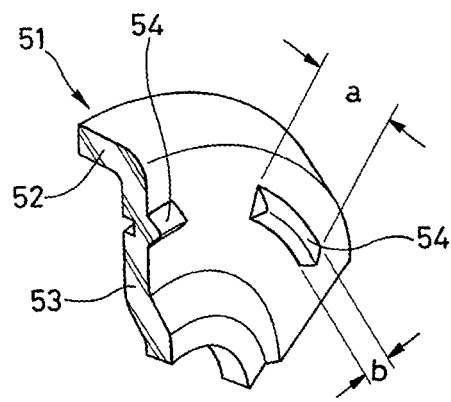
FIG. 3 is a partly perspective view of a backup ring in the lip type seal.

As a shape of the projecting section 54, as shown in FIG. 3, it is possible to further enlarge the retaining force of the second lip seal member 41 for the prevention of the movement in the radial direction, by making a width a in a circumferential direction larger than a width b in a radial direction.

The number and position of the projecting section 54 formed on the circumference may not be in line with the number and position of the protrusion section 35 and the concave section 36 formed on the circumference, but may be in line with them. In the case of being in line with them, the projecting section 54 and the protrusion section 35 strongly pinch the second lip seal member 41 from both sides in the axial direction.

Further, an annular projection 26 is provided in an end surface in the ambient air side of the radial portion 23 in the first lip seal member 21. The annular projection 26 comes into close contact with an end surface in the sealed fluid side of the second lip seal member 41 in an inner peripheral side of the first flange section 33 of the case 31 all over a whole periphery, and seals between both the lip seal members 21 and 41. Therefore, since the projection 26 mentioned above is provided, it is possible to improve a sealing performance between the first lip seal member 21 and the assembly which is assembled by the case 31 including the second lip seal member 41 and the backup ring 51. Further, while the whirling preventing structure is partial in the circumferential direction, the attitude of the second lip seal member 41 is stable in the case that the annular projection 26 is thus provided so that the second lip seal member 41 is pressed uniformly in the circumferential direction by the first lip seal member 21. Therefore, it is possible to improve the sealing performance from this regard.

The lip type seal 1 having the structure mentioned above is used, for examples, as a shaft seal applied to a water pump for a motor vehicle, as mentioned above, and is characterized in that the following operations and effects can be achieved by the structure.

First of all, the lip type seal 1 having the structure mentioned above has six parts constructed by the cartridge 11, the first lip seal member 21 made of the rubber-like elastic material, the case 31, the second lip seal member 41 made of the resin, the backup ring 51 and the adapter 61, as the component parts. Among them, the first lip seal member 21 made of the rubber-like elastic material is fitted in the non-bonding manner to the cartridge 11, the case 31 is fitted in the non-bonding manner to the first lip seal member 21, the second lip seal member 41 made of the resin and the backup ring 51 are retained in the caulking manner to the case 31, and the adapter 61 is fitted to the cartridge 11. Therefore, since six parts are assembled in the non-bonding manner without being bonded to each other, it is possible to easily separate and sort each of the parts at a time of disassembling the seal. Accordingly, it is possible to comply with the request on the recycle for disposing the component parts of the lip type seal 1 after sorting on the material.

Further, since the second lip seal member 41 and the backup ring 51 are caulked and retained in the caulking manner to the case 31, these three parts 31, 41 and 51 can be firmly assembled with each other in spite of the non-bonding, and do not relatively move in the axial direction. In the case 31, the first flange section 33 thereof in the sealed fluid side is arranged so as to come into contact with the radial portion 23 of the first lip seal member 21, and the second flange section 34 in the ambient air side is arranged so as to come into contact with the flange section 13 of the cartridge 11, whereby the cartridge 11, the case 31 and the first lip seal member 21 are accurately positioned with each other in the axial direction. Since the adapter 61 is fitted to the cartridge 11 in the sealed fluid side of the first lip seal member 21, the first lip seal member 21 does not come off in the axial direction from the cartridge 11. Accordingly, since all of six parts are firmly assembled in association with each other, it is possible to increase an assembly retaining force between the parts. Therefore, it is possible to prevent the problem that only some of the parts are pulled out at a time of detaching the lip type seal from the housing as in the prior art mentioned above from being caused.

Further, in the lip type seal 1 having the structure mentioned above, six parts have been already integrated by caulking and fitting at a time of installing the lip type seal 1 to the housing 72, and the assembly has been finished in an immediately usable state. Accordingly, it is possible to omit the adjusting step or the like for maintaining the assembly length precision in the axial direction which is required in the installing step of the conventional non-bonding type lip seal mentioned above.

Further, since the first lip seal member 21 made of the rubber-like elastic material is fitted in the non-bonding manner to the cartridge 11, and the case 31 is fitted in the non-bonding manner to the first lip seal member 21, the lip type seal 1 does not have such a structure that the rubber-like elastic material (the first lip seal member 21) is bonded through vulcanization to the metal (the cartridge 11 or the case 31). Accordingly, even if the lip type seal 1 is used under a high load condition, a foaming phenomenon which is peculiar to the bonding structure is not caused in the rubber-like elastic material. Therefore, it is possible to improve a resistance against foaming of the lip type seal 1, and it is possible to stabilize a sealing performance.

Further, since the first lip seal member 21 is structured such as to be prevented from coming off from the cartridge 11 by fitting the adapter 61 to the sealed fluid side of the first lip seal member 21 without deforming the first lip seal member 21 greatly at a time of inserting the first lip seal member 21 made of the rubber-like elastic material to the cartridge 11, it is possible to secure a circularity and a coaxiality of the seal lip 24 of the first lip seal member 21, as a result of the fact that the first lip seal member 21 does not deform greatly. Accordingly, it is possible to stabilize a sealing performance by the seal lip 24 of the first lip seal member 21.

Further, since the protrusion section 35 in the partial portion on the circumference is provided in the end surface in the ambient air side of the first flange section 33 in the case 31, the second lip seal member 41 made of the resin is prevented from whirling with respect to the case 31 and is prevented from coming off to the inner side in the radial direction on the basis of the engagement of the protrusion section 35 with the second lip seal member 41 made of the resin, the projecting section 54 in the partial portion on the circumference is provided in the end surface in the sealed fluid side of the flange section 53 in the backup ring 51, and the second lip seal member 41 made of the resin is prevented from whirling with respect to the backup ring 51 and is prevented from coming off to the inner side in the radial direction on the basis of the engagement of the projecting section 54 with the second lip seal member 41 made of the resin in the same manner, it is possible to firmly retain the second lip seal member 41 by the protrusion section 35 and the projecting section 54. Therefore, it is possible to effectively prevent the component parts from relatively whirling, and it is possible to effectively prevent the second lip seal member 41 made of the resin from being dragged by the shaft 74 at a time of inserting the shaft so as to come off to the inner side in the radial direction from the portion between the case 31 and the backup ring 51, whereby it is possible to stabilize the sealing performance from this regard.

Further, since the concave section 36 in the partial portion on the circumference is provided on the back surface of the first flange section 33 at a time of the protrusion section 35 being formed by the pressing process, and the case 31 and the first lip seal member 21 are prevented from whirling on the basis of the engagement of the first lip seal member 21 made of the rubber-like elastic material with the concave section 36, it is possible to effectively prevent the parts from whirling with respect to each other on the basis of a simple structure obtained by only providing the concave section 36 in the partial portion on the circumference in the case 31. Therefore, it is possible to prevent the assembled product constructed by the second lip seal member 41, the backup ring 51 and the case 31 from co-rotating on the basis of the sliding motion with the shaft 74, whereby it is possible to stabilize the sealing performance from this regard.

Further, since the annular projection 26 which comes into close contact with the end surface in the sealed fluid side of the second lip seal member 41 all over a whole periphery in the inner peripheral side of the first flange section 33 in the case 31 is provided in the end surface in the ambient air side of the radial portion 23 in the first lip seal member 21, it is possible to improve the sealing performance, and since the annular projection 26 presses the second lip seal member 41 all over a whole periphery, it is possible to stabilize the attitude of the second lip seal member 41. Therefore, it is possible to stabilize the sealing performance from this regard.

Second Embodiment

Figure 4:
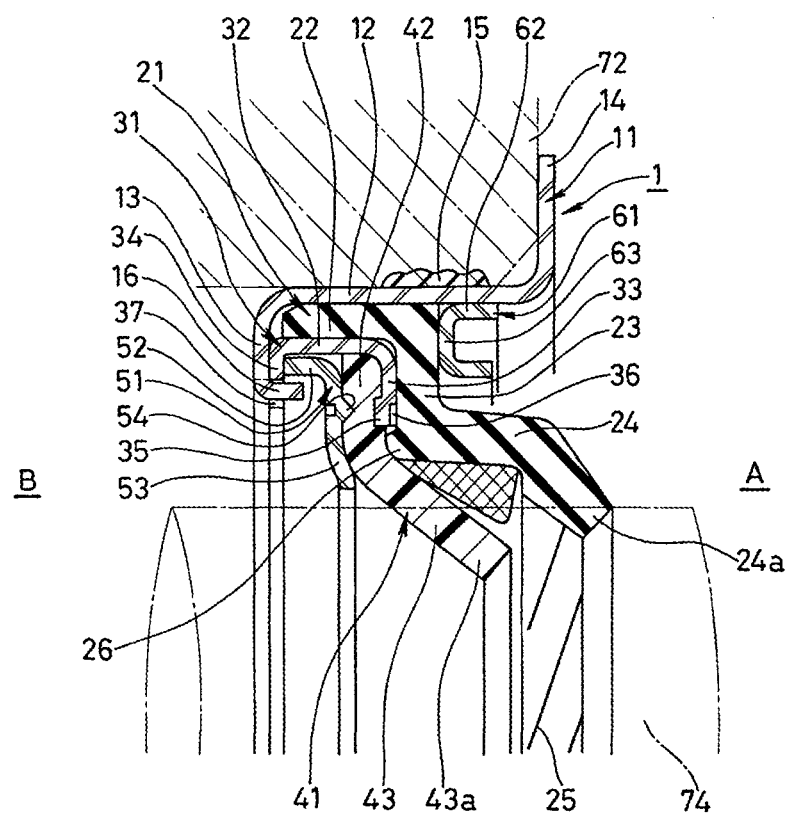
FIG. 4 is a sectional view of a substantial part of a lip type seal in accordance with a second embodiment of the present invention.

In this case, the first embodiment mentioned above is structured such that the flange section 13 of the cartridge 11 and the second flange section 34 of the case 31 are contacted to each other in the axial direction, however, if the whirling preventing structure is provided here, it is possible to effectively prevent the assembly constructed by the second lip seal member 41 made of the resin, the backup ring 51 and the case 31 from co-rotating on the basis of the sliding motion with the shaft 74. FIG. 4 is a second embodiment in which the whirling preventing structure mentioned above is provided. In particular, a pawl section 16 in a partial portion on a circumference is provided in an inner peripheral edge portion of the flange section 13 of the cartridge 11, and a notch section 37 is provided in an inner peripheral edge portion of the second flange section 34 of the case 31 in correspondence to the pawl section 16, and the pawl section 16 is folded to the sealed fluid side A so as to engage with the notch section 37, whereby the cartridge 11 and the case 31 are prevented from whirling. The pawl section 16 and the notch section 37 are provided at one position or a plurality of positions (for example, three arranged at a uniform interval) on the circumference.

The seal lip 24 of the first lip seal member 21 in the first embodiment mentioned above is provided in the sliding portion with a screw section (a screw seal) 25 which achieves a sealing action by pushing back the sealed fluid on the basis of a pumping action at a time when the shaft rotates, and the following variations can be thought with respect to this screw section 25.

Third Embodiment

Figure 5:
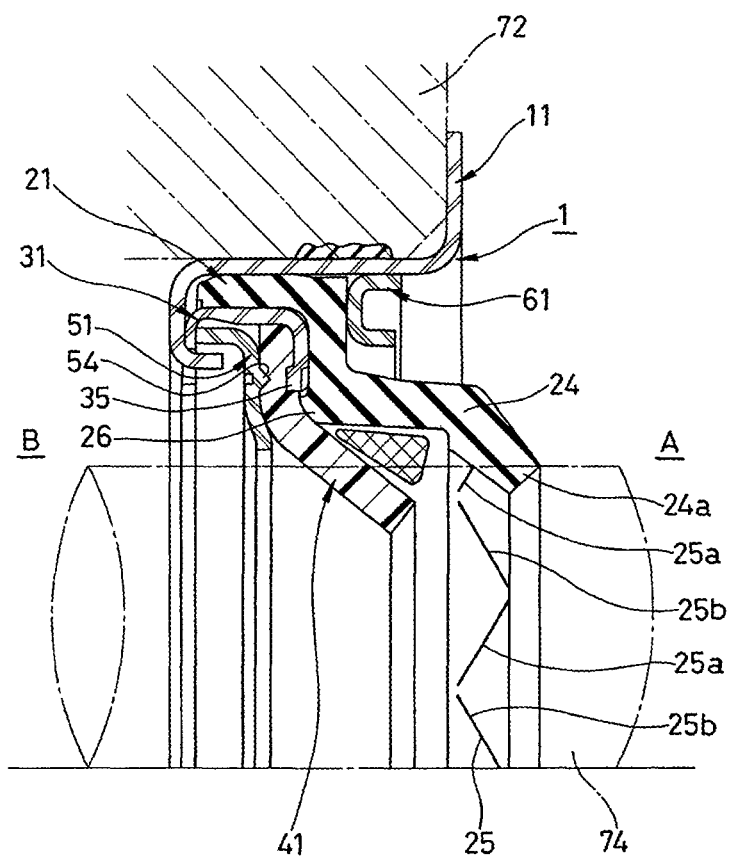
FIG. 5 is a sectional view of a substantial part of a lip type seal in accordance with a third embodiment of the present invention.

In FIG. 2 in accordance with the first embodiment mentioned above, the screw section 25 is constructed as the one-way screw structure, however, in FIG. 5 which is shown as a third embodiment, the screw section 25 is constructed as a two-way screw structure, that is, a lot of threads (unit threads) 25a in a forward direction and threads (unit threads) 25b in a reverse direction, in which directions of incline (directions of incline of the threads) are set to opposite directions to each other, are provided alternately on the circumference. Since the rotating direction of the shaft 74 is generally determined per machine kind of pump, the screw section 25 sufficiently functions even if it has the one-way screw structure, however, taking into consideration the case that the lip type seal 1 is assembled in many kinds of pumps, it is preferable that the screw section 25 has the two-way screw structure, and if the screw section 25 has the two-way screw structure as mentioned above, it is applicable whichever direction the shaft 74 rotates.

Fourth Embodiment

Figure 6:
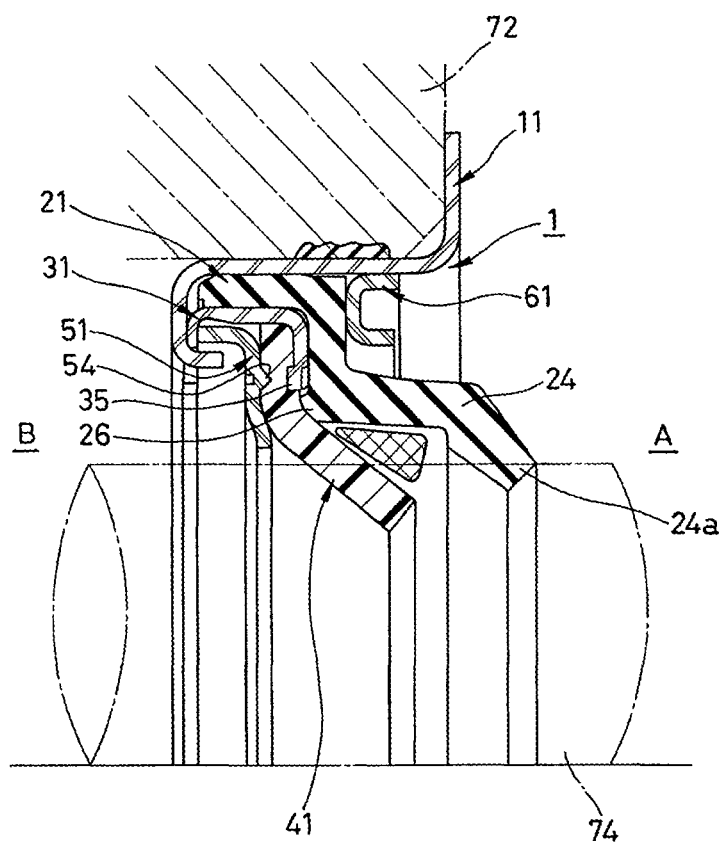
FIG. 6 is a sectional view of a substantial part of a lip type seal in accordance with a fourth embodiment of the present invention.

However, since the screw section 25 is an additional structure in the present invention, the screw section 25 may be omitted as seen in FIG. 6 which is shown as the fourth embodiment. This no-screw structure is used in the case that it is desired to improve the sealing performance by improving close contact to the shaft 74 of the seal lip 24.

Further, although an illustration is omitted, as the screw section 25, it can be thought that a structure which achieves a lubricating action by sucking the sealed fluid by carrying out the pumping action at a time when the shaft rotates is provided in the sliding portion of the seal lip 24.

With regard to the cartridge 11, the following variations can be thought.

In order to adapt the lip type seal 1 to the bore diameter (the inner diameter of the shaft hole) of the housing 72, a cartridge having a three-dimensional structure in a radial direction is used as the cartridge 11. In accordance with the structure mentioned above, it is possible to apply to many kinds of pumps by preparing one size as the lip type seal 1. Further, it is possible to apply to many kinds of pumps by preparing the cartridges 11 which have different S-shaped sectional shapes according to housing shapes and a positional relationship to peripheral parts, and it is possible to change parts from a mechanical seal.

Fifth to Seventh Embodiments

Figure 8:
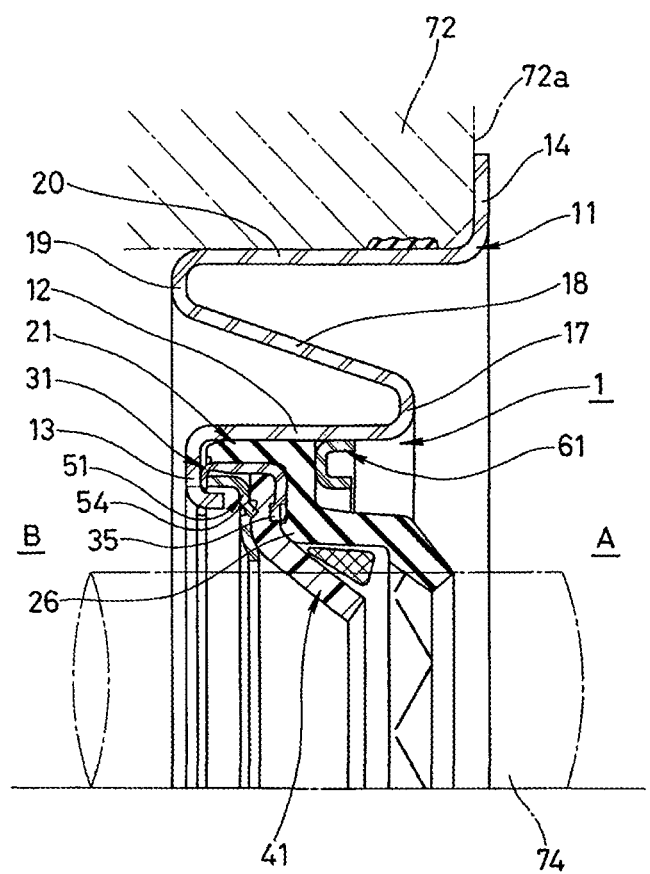
FIG. 8 is a sectional view of a substantial part of a lip type seal in accordance with a sixth embodiment of the present invention.
Figure 9:
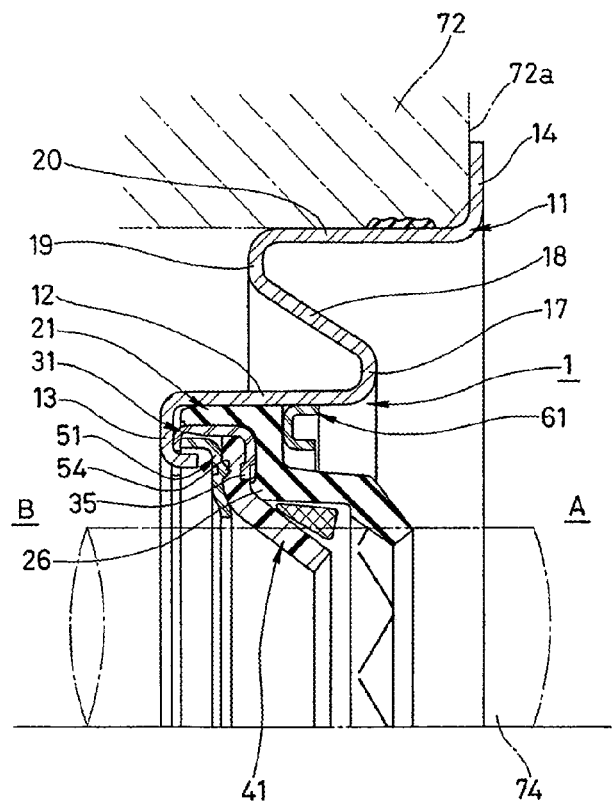
FIG. 9 is a sectional view of a substantial part of a lip type seal in accordance with a seventh embodiment of the present invention.
Figure 10:
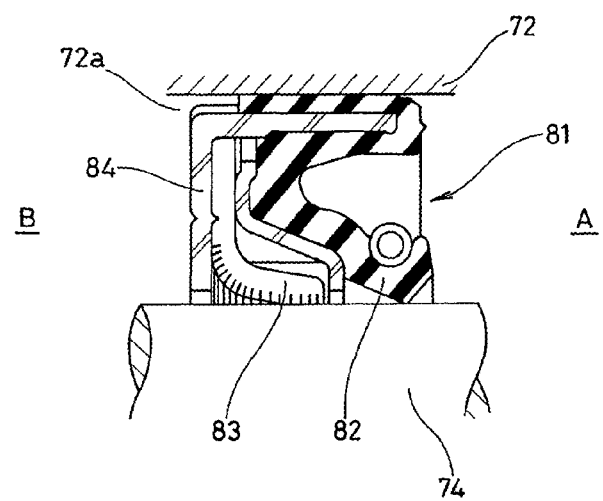
FIG. 10 is a half cut sectional view of a lip seal in accordance with a conventional art.
Figure 11:
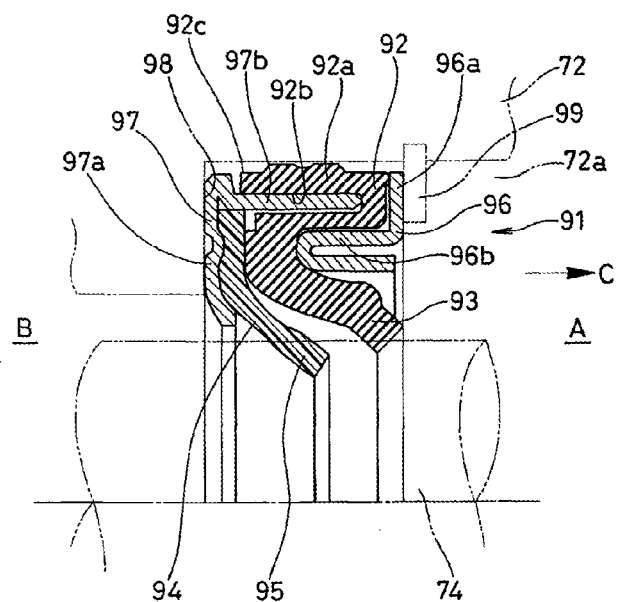
FIG. 11 is a half cut sectional view of a lip seal in accordance with another conventional art.
Figure 12:
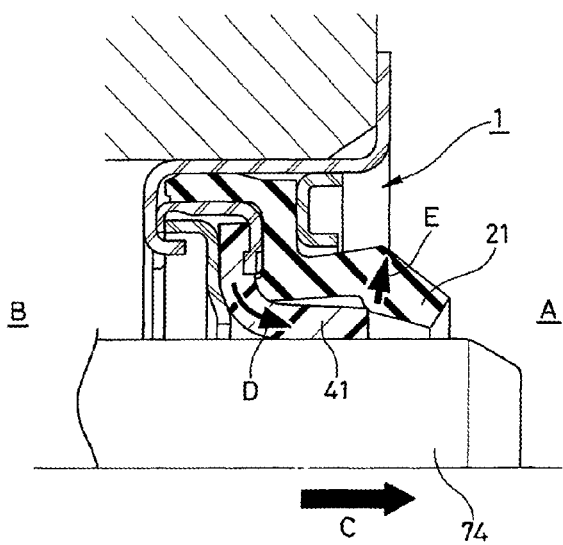
FIG. 12 is a half cut sectional view showing a disadvantage causing state at a time of inserting a shaft in a lip seal in accordance with a comparative example.

From this point of view, in each of FIG. 7 which is shown as a fifth embodiment, FIG. 8 which is shown as a sixth embodiment and FIG. 9 which is shown as a seventh embodiment, the cartridge 11 is structured as follows.

The cartridge 11 is constructed by a predetermined rigid material such as a metal or the like, for example, a pressed product of a metal sheet, is formed in an annular shape as a whole, has a tubular section 12 in which an inward flange section 13 is integrally formed in an end portion in an ambient air side, an inner peripheral side reverse section 17 having a circular arc sectional shape is integrally formed in an end portion in a sealed fluid side of the tubular section 12 so as to be directed to an outer side in the radial direction, a radial enlarged section 18 having a linear sectional shape is integrally formed from an outer peripheral end portion of the inner peripheral side reverse section 17 toward a diagonally outer side in the radial direction, an outer peripheral side reverse section 19 having a circular arc sectional shape is integrally formed in an outer peripheral end portion of the radial enlarged section 18 so as to be directed to an outer side in the radial direction, an outer peripheral side tubular section 20 is integrally formed from an outer peripheral end portion of the outer peripheral side reverse section 19 toward one side in an axial direction (the sealed fluid side), and an outward flange section 14 is integrally formed in an end portion in the sealed fluid side of the outer peripheral side tubular section 20. These cartridges 11 retain the first lip seal member 21 and the adapter 61 to the inner peripheral side of the tubular section 12, and are fitted to an inner periphery of a shaft hole of a housing 72 by the outer peripheral side tubular section 20. The cartridge 11 is formed in an S-shaped sectional shape as a whole, can elastically deform in the radial direction, and has a spring characteristic in the radial direction. The radial enlarged section 18 may be formed in a flat surface shape which is orthogonal to a center axis of the lip type seal 1, however, in this case, the spring characteristic in the radial direction reduces or disappears.

Figure 7:
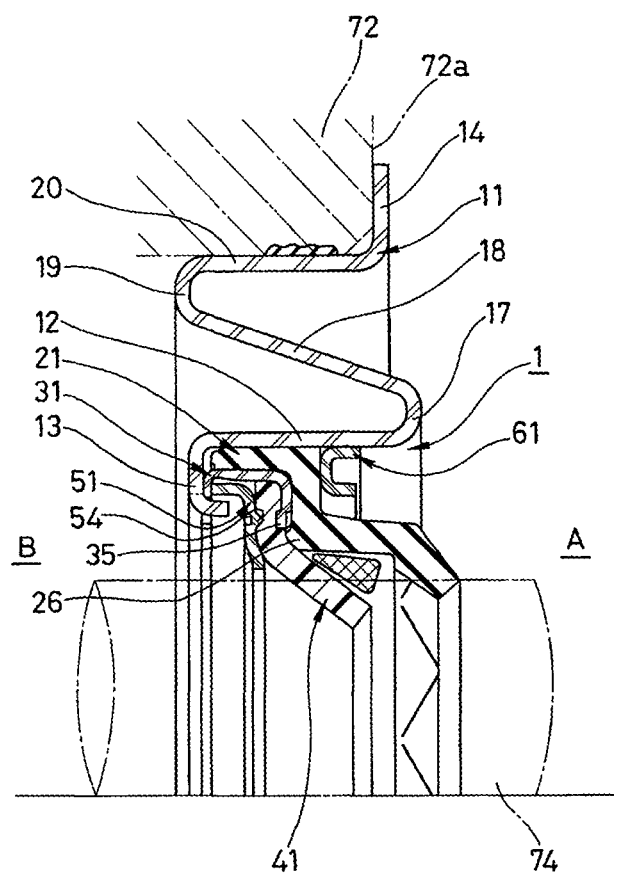
FIG. 7 is a sectional view of a substantial part of a lip type seal in accordance with a fifth embodiment of the present invention.

The embodiment in FIG. 7 is formed in such a shape that the outer peripheral side reverse section 19 protrudes to one side (the ambient air side) in the axial direction in comparison with the inward flange section 13, and the inner peripheral side reverse section 17 protrudes to one side (the sealed fluid side) in the axial direction in comparison with the outward flange section 14. The embodiment in FIG. 8 is formed in such a shape that the outer peripheral side reverse section 19 protrudes to one side (the ambient air side) in the axial direction in comparison with the inward flange section 13, and the outward flange section 14 protrudes to one side (the sealed fluid side) in the axial direction in comparison with the inner peripheral side reverse section 17. Further, the embodiment in FIG. 9 is formed in such a shape that the inward flange section 13 protrudes to one side (the ambient air side) in the axial direction in comparison with the outer peripheral side reverse section 19, and the outward flange section 14 protrudes to one side (the sealed fluid side) in the axial direction in comparison with the inner peripheral side reverse section 17. As mentioned above, it is possible to adjust the insertion depth in the axial direction of the lip type seal 1 with respect to the end surface 72a of the housing 72 by appropriately changing these shapes.

What is claimed is:

1. A lip type seal which is installed to an inner periphery of a shaft hole of a housing so as to slidably come into close contact with a peripheral surface of a shaft, thereby inhibiting a sealed fluid within a machine from leaking to an ambient air side, the lip type seal comprising:

a cartridge which is fitted to the inner periphery of said shaft hole;

a first lip seal member which is fitted to said cartridge in a non-bonding manner and is made of a rubber-like elastic material;

a case which is fitted to said first lip seal member in a non-bonding manner;

a second lip seal member which is made of a resin and a backup ring which supports the second lip seal member, the second lip seal member and the backup ring being retained in a caulking manner to said case; and an adapter which is fitted to said cartridge in a sealed fluid side of said first lip seal member, wherein said cartridge integrally has an inward flange section in an ambient air side end portion of a tubular section, said first lip seal member integrally has a cylinder section which is fitted to an inner peripheral side of the tubular section of said cartridge, a radial portion which is provided in an end portion in the sealed fluid side of said cylinder section, and a seal lip which is provided in an inner peripheral end portion of said radial portion, said case integrally has a tubular section which is fitted between said radial portion and the flange section of the cartridge in an inner peripheral side of the cylinder section of said first lip seal member, a first flange section which is provided in the end portion in the sealed fluid side of said tubular section in such a manner as to be in contact with said radial portion, and a second flange section which is provided in an end portion in an ambient air side of said tubular section in such a manner as to be in contact with the flange section of said cartridge, and retains in a caulking manner said second lip seal member and the backup ring between said first and second flange sections, said backup ring has a flange section which pinches said second lip seal member with respect to the first flange section of said case, said adapter prevents said first lip seal member from coming off from said cartridge by being fitted to said cartridge in the sealed fluid side of said first lip seal member, a plurality of protrusion sections each in a partial portion on a circumference is provided in the first flange section in said case, said plurality of protrusion sections being spaced apart from one another at a uniform interval, and each of said plurality of protrusion sections is engaged with said second lip seal member made of the resin, so that said second lip seal member made of the resin is prevented from whirling with respect to said case and prevented from coming off to an inner side in a radial direction, and a plurality of projecting sections each in a partial portion on a circumference is provided in the flange section in said backup ring, said plurality of projecting sections be n s aced a art from one another at a uniform interval, each of said plurality of projecting sections having a first width in a circumferential direction and a smaller second width in a radial direction, and each of said plurality of projecting sections is engaged with said second lip seal member made of the resin so that said second lip seal member made of the resin is prevented from whirling with respect to said backup ring and prevented from coming off to the inner side in the radial direction.

2. The lip type seal according to claim 1, wherein a number and position of said plurality of projecting sections provided in the flange section in said backup ring match a number and position of said protrusion sections provided in the flange section in said backup ring so as to pinch said second lip seal member made of the resin from both sides in an axial direction.

3. The lip type seal according to claim 2, wherein each of said plurality of projecting sections has a triangular cross sectional shape and a pair of circumferential end walls extending orthogonally relative to said flange section of said backup ring.

4. The lip type seal according to claim 3, wherein said flange section includes a groove opposite said plurality of projecting sections, said groove having a rectangular cross-sectional shape.

* * * * *